US009823779B2

(12) United States Patent
Zhang

(10) Patent No.: US 9,823,779 B2
(45) Date of Patent: Nov. 21, 2017

(54) METHOD AND DEVICE FOR CONTROLLING A HEAD-MOUNTED DISPLAY BY A TERMINAL DEVICE

(71) Applicant: Qingdao GoerTek Technology Co., Ltd., Qingdao, ShanDong (CN)

(72) Inventor: Xiangjun Zhang, Qingdao (CN)

(73) Assignee: QINGDAO GOERTEK TECHNOLOGY CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/122,776

(22) PCT Filed: Jun. 16, 2015

(86) PCT No.: PCT/CN2015/081534
§ 371 (c)(1),
(2) Date: Aug. 31, 2016

(87) PCT Pub. No.: WO2015/192763
PCT Pub. Date: Dec. 23, 2015

(65) Prior Publication Data
US 2017/0131839 A1    May 11, 2017

(30) Foreign Application Priority Data
Jun. 16, 2014 (CN) .......................... 2014 1 0266809

(51) Int. Cl.
G06F 3/041 (2006.01)
G06F 3/01 (2006.01)
G06F 3/0488 (2013.01)

(52) U.S. Cl.
CPC .......... *G06F 3/0418* (2013.01); *G06F 3/011* (2013.01); *G06F 3/04883* (2013.01); *G06F 3/04886* (2013.01)

(58) Field of Classification Search
CPC .................................................... G06F 3/0418
(Continued)

(56) References Cited

U.S. PATENT DOCUMENTS

| 2014/0204002 A1* | 7/2014 | Bennet ............. | G06F 3/011 345/8 |
| 2014/0320383 A1* | 10/2014 | Goto .................. | G02B 27/017 345/8 |
| 2015/0002373 A1* | 1/2015 | Kobayashi ......... | G02B 27/017 345/8 |

FOREIGN PATENT DOCUMENTS

CN            101673161        3/2010

OTHER PUBLICATIONS

PCT/CN2015/081534, Written Opinion, dated Sep. 8, 2015 (5 pages) and English Translation (4 pages).

* cited by examiner

*Primary Examiner* — Long D Pham
(74) *Attorney, Agent, or Firm* — Boyle Fredrickson, S.C.

(57) ABSTRACT

This invention discloses a method and device for controlling a touch screen, including: determining that that the touch screen is working in a track mode; when a finger is sliding on the touch screen, obtaining a sliding track of the finger and displaying the sliding track on both the terminal device and the head-mounted display device synchronously, wherein the sliding track is used to locate the position of the finger on the touch screen; when a switching condition is satisfied, switching the touch screen from the track mode to a trigger mode; and when an operation instruction to the touch screen is detected, triggering the touch screen to perform the corresponding function in accordance with the operation instruction. Compared with existing technologies, the method and device provided by this invention have a (Continued)

higher control precision of the touch screen, do not need to add additional hardware and thus reduce the cost invested.

10 Claims, 5 Drawing Sheets

(58) Field of Classification Search
USPC .................................................. 345/173, 8
See application file for complete search history.

METHOD AND DEVICE FOR CONTROLLING A HEAD-MOUNTED DISPLAY BY A TERMINAL DEVICE

FIELD OF THE INVENTION

This invention relates to the field of terminal device control technology, and particularly relates to a method and device for controlling touch screen.

BACKGROUND OF THE INVENTION

In recent years, as wearable devices become popular, head-mounted display devices also have been developed rapidly. Currently, many head-mounted display devices can be connected externally with terminal devices, e.g., mobile phones, PADs, etc. When a user transmits display signals of a terminal device to a head-mounted display device, the user can view the content displayed on the terminal device through the head-mounted display device. Therefore, a better viewing experience can be achieved.

However, when the user starts to use the head-mounted display device to watch the content displayed on the terminal device, the operating screen of the terminal device, namely, the touch screen, cannot be seen. Accordingly, the user cannot operate on the touch screen of the terminal device directly.

In existing technologies, in order to solve the above-described problem, usually a related sensor is added to the head-mounted display device. First, the user's gesture is collected. The collected user's gesture is then recognized by the sensor in order to achieve the purpose of controlling the terminal device. However, the current technology of gesture recognition is not mature and the recognition accuracy is not high. In order to achieve a higher recognition accuracy, the implementation system is complicated and has a higher cost.

Therefore, the problems to be solved are how to achieve the direct control of the touch screen of the terminal device, and how to improve the precision of the touch screen controlling.

SUMMARY OF THE INVENTION

The embodiments of this disclosure provide a method and device for controlling the touch screen, to solve the problems of the existing technologies, i.e., low accuracy of the touch screen controlling when the terminal device has been connected with the head-mounted display device and the touch screen of the terminal device is not visible.

The embodiments of this disclosure provide a method of controlling the touch screen, applied to control a touch screen of a terminal device after the terminal device has been connected to the head-mounted display device and the touch screen of the terminal device is not visible. The method comprises:

Determining that the touch screen is working in a track mode;

When a finger of a user is sliding on the touch screen, obtaining a sliding track of the finger and displaying the sliding track on both the terminal device and the head-mounted display device synchronously, where the sliding track is used to locate the position of the linger on the touch screen;

When a switching condition is satisfied, switching the touch screen from the track mode to a trigger mode;

When an operation instruction to the touch screen is detected, triggering the touch screen to perform a corresponding function in accordance with the operation instruction.

Accordingly, the embodiments of this disclosure also provide a touch screen controlling device applied to control a touch screen of a terminal device when the terminal device has been connected with the head-mounted display device and the touch screen of the terminal device is not visible. The touch screen controlling device comprises:

A mode determination unit used to determine that the touch screen is working in the track mode;

A display unit configured to, when a finger is sliding on the touch screen, obtain a sliding track of the finger of the finger and displaying the sliding track on both the terminal device and the head-mounted display device synchronously, wherein the sliding track is used to locate the position of the finger on the touch screen;

A mode switching unit configured to switch the touch screen from the track mode to a trigger mode when a switching condition is satisfied; and A processing unit configured to, when an operation instruction to the touch screen is detected, trigger the touch screen to perform a corresponding function in accordance with the operation instruction.

The beneficial effects of this invention include the following.

In the method and device provided by the embodiments of this disclosure, the terminal device works in two modes. First, in the track mode, the sliding track of the user's finger is obtained and displayed on the terminal device. At this point, the content displayed on the terminal device is synchronously displayed on the head-mounted display device. Therefore, the user can view the finger's position on the touch screen through the head-mounted display device. Accordingly, in the track mode, the function of locating the position of the user's finger can be performed. This way, after the terminal device is switched to the trigger mode, the user is enabled to conduct normal touch operations on the touch screen. With the method and device provided by the embodiments of this invention applied, users are allowed to control the touch screen of the terminal device directly. Compared with the control method relying on recognizing gestures via sensors, the method and device provided by the embodiments of this invention have a higher control precision, to not need to add any additional hardware and thus reduce the cost invested.

Other features and advantages of this disclosure will be described below, and they will become apparent from the description or be learned by implementing this disclosure. The objectives and other advantages of the disclosure may be realized and obtained via the structure particularly described in the specification and claims and depicted in the drawings.

BRIEF DESCRIPTION OF THE DRAWINGS

Drawings are used to provide a further understanding of this invention and constitute part of the specification, and serve to explain this invention along with embodiments of this invention, and are not construed as limiting this invention. In the drawings.

DETAILED DESCRIPTION OF THE PREFERRED EMBODIMENTS

When the terminal device has been connected to the head-mounted display device and the touch screen of the terminal device is not visible, in order to provide an implementation scheme for improving the control accuracy of the touch screen, the embodiments of this invention provide a method and device for controlling the touch screen. The preferred embodiments of this invention will be described below by combining the drawings. It should be understood that the preferred embodiments described herein are intended to only illustrate and explain the present invention and are not intended to limit this invention. In addition, if no conflict, the embodiments of the disclosure as well as features of the embodiments can be combined with each other.

The First Embodiment

Figure 1:
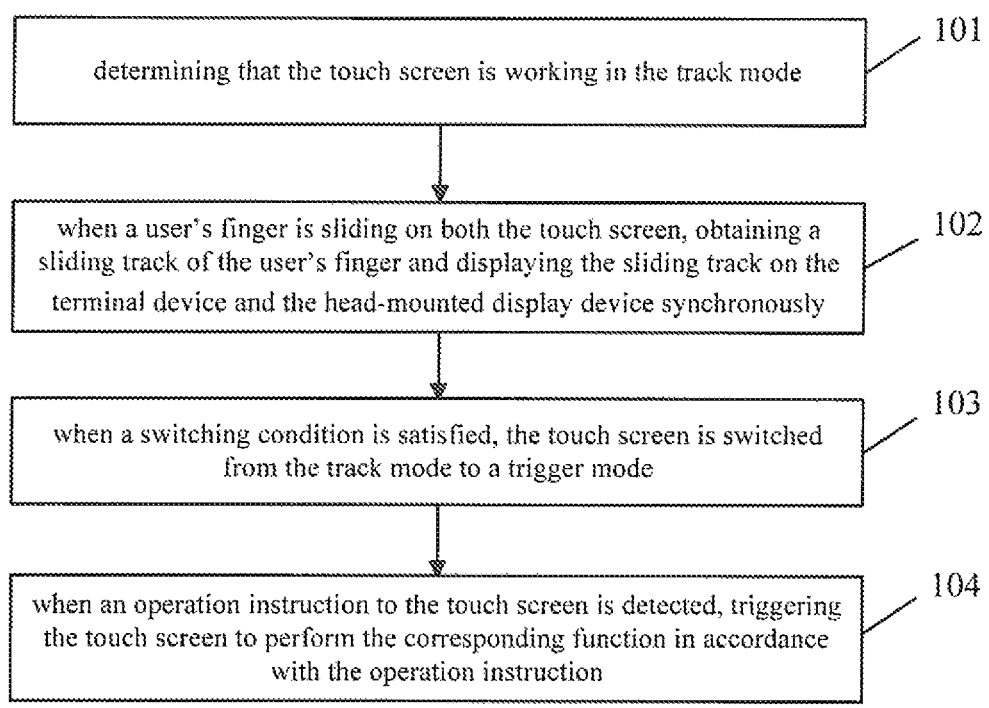
FIG. 1 is a flowchart of a method of controlling a touch screen according to a first embodiment of this invention.

The embodiments of this invention provide a method of controlling a touch screen. The method is used to control the touch screen when the terminal device has been connected with the head-mounted display device and the touch screen of the terminal device is not visible. The steps of the method are shown in FIG. 1, including:

At step 101, determining that the touch screen is working in the track mode.

At step 102, when a user's finger is sliding on the touch screen, obtaining a sliding track of the user's finger and displaying the sliding track on both the terminal device and the head-mounted display device synchronously, wherein the sliding track is used to locate the position of the finger on the touch screen.

At step 103, when a switching condition is satisfied, the touch screen is switched from the track mode to a trigger mode.

At step 104, when an operation instruction to the touch screen is detected, triggering the touch screen to perform the corresponding function in accordance with the operation instruction.

In such a scenario, the terminal device in the embodiment of this invention can be a touch-control terminal device, such as a smart phone, a tablet, etc., and also can be a smart television (TV) controlled through a touch-control remote controller. In the embodiment of this invention, the work mode of the touch screen includes a track mode and a trigger mode. In the track mode, the sliding track of the finger sliding on the touch screen is displayed on the terminal device without triggering any function. In the trigger mode, users are enabled to conduct operations such as clicking, enlarging, shrinking, and so on. During the process of achieving the above-described steps, because of the connection of the terminal device and the head-mounted display device, content displaying on the terminal device is also displayed on the head-mounted display device simultaneously. In this way, users are enabled to watch the fingers position on the touch screen through the head-mounted display device and thus control the touch screen of the terminal device directly. Compared with the control method relying on recognizing gestures via sensors, the embodiment has a higher control precision, does not need to add any additional hardware and thus reduces the cost invested.

The Second Embodiment

Figure 2:
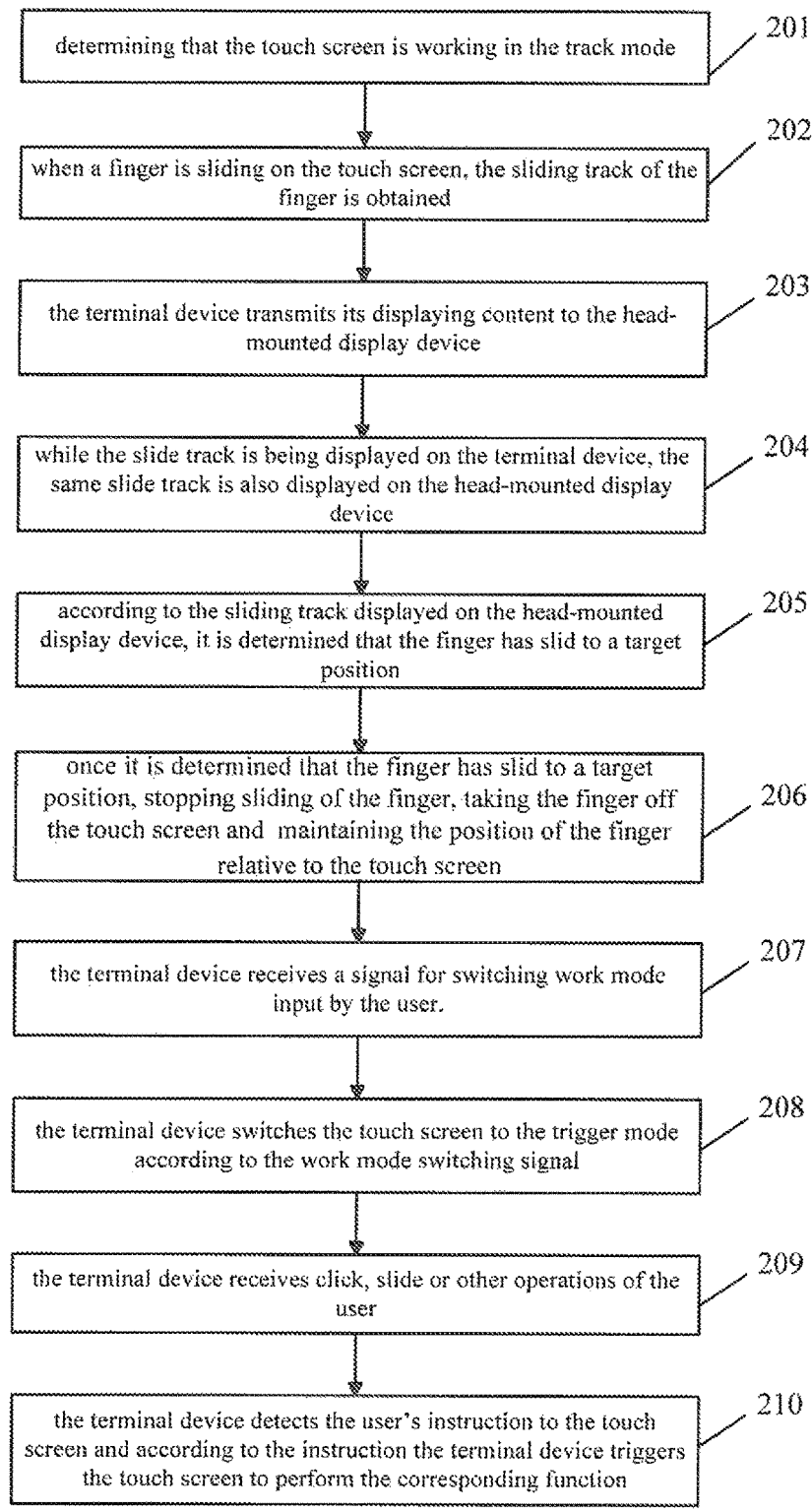
FIG. 2 is a flowchart of a method of controlling a touch screen according to a second embodiment of this invention.

The method provided by this invention is described in detail in conjunction with FIG. 2 and using the specific embodiment. The specific flow chart of the method is shown in FIG. 2, including:

At step 201, determining that the touch screen is working in the track mode.

The following methods can be used to determine that the touch screen is working in the track mode.

The first method is described below.

The button on the terminal device used for the work mode switching button is confirmed to be set in the track mode state.

Specifically, the work mode switching button can be set on the side key of the terminal device, i.e., the physical button on side of the terminal device. Users can switch the work mode of the terminal device through switching the work mode switching button, for example, simultaneously pressing two certain side buttons or long-pressing one certain side button. In practical applications, when the device is not visible, the physical button is easier to be located for users.

Alternatively, the work mode switching button can be set in the touch screen area of the terminal device. In such a case, the work mode switching button is a floating button displaying on the screen. To facilitate users' operation, the floating button can be set at the sides or corners of the screen. Users can switch the work mode of the terminal device by switching the work mode switching button. After the terminal device is connected with the head-mounted display device, users can see the floating button in the head-mounted display device.

The second method is described as the following.

The touch screen is triggered to work in the track mode by a preset track graph. For example, when users draw a circular shape on the screen, the touch screen is triggered to work in the track mode. In such a scenario, the specific track graph can be set by users arbitrarily.

At step 202, when a finger is sliding on the touch screen, the sliding track of the finger is obtained.

At step 203, the terminal device transmits its displaying content to the head-mounted display device.

In such a step, the displaying content contains the sliding track of the finger. The displaying content can be transmitted through the data line of the High Definition Multimedia Interface (HDMI) or the Mobile High-Definition Link (MHL), but not limited to the above two implementations.

At step 204, while the slide track is being displayed on the terminal device, the same slide track is also displayed on the head-mounted display device.

In such a step, the sliding track is displayed as a line of the finger sliding over, or as a series of marks (points, circles, etc.) following the movement of the finger. Displaying the sliding track of the finger is to locate the finger's position.

At step 205, according to the sliding track displayed on the head-mounted display device, the terminal device determines that the finger has slid to a target position.

At step 206, once it is determined that the finger has slid to a target position, stopping sliding of the finger, taking the finger off the touch screen and maintaining the position of the finger relative to the touch screen.

Figure 3A:
FIG. 3(a) is a first work mode switching pattern for the terminal device according to the second embodiment of this invention.
Figure 3B:
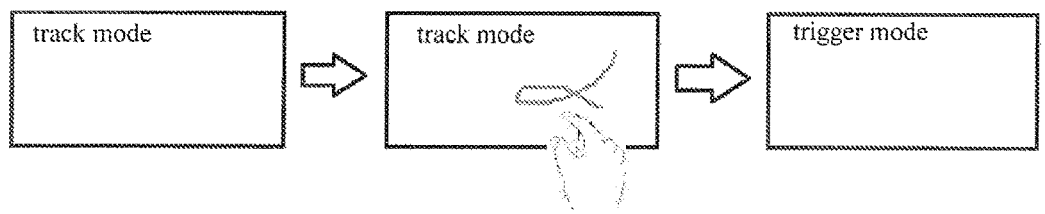
FIG. 3(b) is a second work mode switching pattern for the terminal device according to the second embodiment of this invention.

At step 207, the terminal device receives a signal for switching work mode input by the user. That is, the work mode of the terminal device is switched to the trigger mode through the work mode switching button by user, or through the pre-set track graph. The mode switching is illustrated in FIG. 3(a) and FIG. 3(b). But it is not limited to the two approaches shown in these Figures.

At step 208, the terminal device receives the signal for switching the work mode input by the user and switches the touch screen to the trigger mode according to the work mode switching signal.

At step 209, the terminal device receives click, slide or other operations of the user.

In such a step, the user can determine how to use the finger to do operations at the target position or the area around the target position based on the determined target position in the above-mentioned steps 205 and 206 and the relative position between the finger and the touch screen.

For convenience, the user can switch the work mode of the terminal device by one hand and use the other hand to slide on the touch screen and trigger operation functions.

At step 210, the terminal device detects the user's instruction to the touch screen and according to the instruction the terminal device triggers the touch screen to perform the corresponding function.

Specifically, the terminal device triggers the corresponding function according to the user's click, slide or other operations.

So far, the control of the touch screen of the terminal device has been completed. The method in the above embodiment can still be used when the user wants to make new operation control to the touch screen. That is, when user cannot determine the position of the finger relative to the touch screen, the track mode of the terminal device is utilized to locate the finger's position and then the operation control is realized via the trigger mode of the touch screen of the terminal device.

Further, if the work mode switching button of the terminal device is a floating button set on the touch screen area of the terminal device and in the case when the user has not used the touch screen for a preset time, the floating button displayed on the touch screen can be hidden or the displaying of the floating button can be closed by a pre-set close button. This way, the floating button is kept from interrupting the view of the user.

The Third Embodiment

Figure 4:
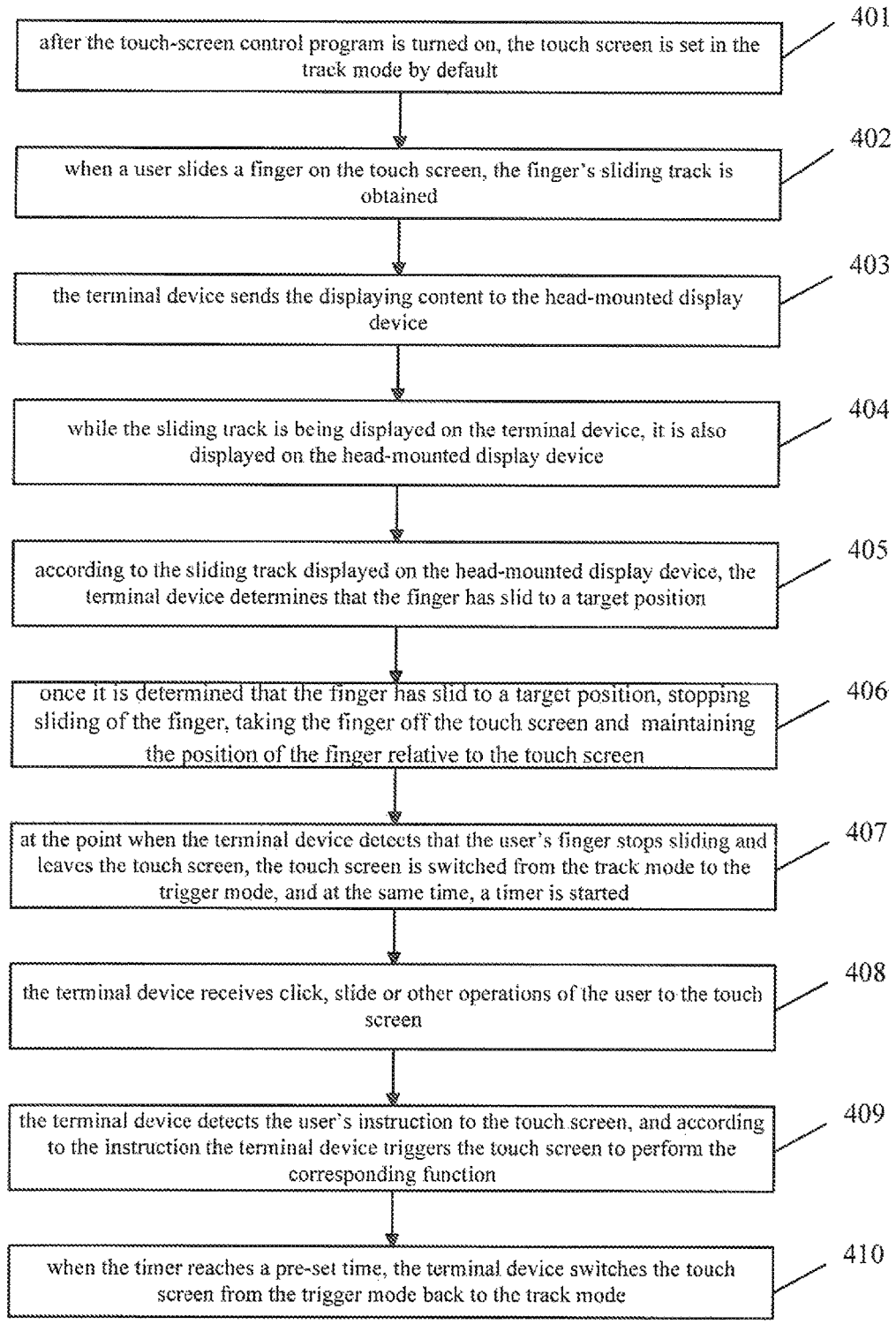
FIG. 4 is a flowchart of a method of controlling a touch screen according to a third embodiment of this invention.

This embodiment of the invention controls the touch screen of the terminal device by automatically switching the work mode. The specific steps are shown in FIG. 4, including the following.

At step 401, after the touch-screen control program is turned on, the touch screen is set in the track mode by default.

At step 402, when a user slides a finger on the touch screen, the finger's sliding track is obtained.

At step 403, the terminal device sends the displaying content to the head-mounted display device.

In such a step, the displaying content includes the sliding track of finger. The displaying content may be transmitted through the data line of HDMI or MHL, but not limited to the above two implementations.

At step 404, while the sliding track is being displayed on the terminal device, it is also displayed on the head-mounted display device.

In such a step, the sliding track is displayed as a line of the finger sliding over or as a series of marks (points, circles, etc.) following the movement of the finger. Displaying the sliding track of the finger is to locate the finger's position.

At step 405, according to the sliding track displayed on the head-mounted display device, the terminal device determines that the finger has slid to a target position.

At step 406, once it is determined that the finger has slid to a target position, stopping sliding of the finger, taking the finger off the touch screen and maintaining the position of the finger relative to the touch screen.

At step 407, at the point when the terminal device detects that the user's finger stops sliding and leaves the touch screen, the touch screen is switched from the track mode to the trigger mode, and at the same time, a timer is started.

At step 408, the terminal device receives click, slide or other operations of the user to the touch screen.

In such a step, an indicator showing the work mode can be set on the terminal device. Thus, the user can learn the current work mode by reading the indicator.

At step 409, the terminal device detects the user's instruction to the touch screen, and according to the instruction the terminal device triggers the touch screen to perform the corresponding function.

Specifically, the terminal device triggers the corresponding function according to the user's click, sliding or other operations.

At step 410, when the timer reaches a pre-set time, the terminal device switches the touch screen from the trigger mode back to the track mode. The pre-set time can be set by users according to their needs, and the time on the timer can also be simultaneously displayed on the screen for the users' reference.

Further, the method in the above embodiment can still be used when the user needs to conduct new operation control to the touch screen. That is, when user cannot determine the relative position between a finger and the touch screen, the track mode of the terminal device is utilized to locate the finger's position and then the operation control is realized via the trigger mode of the touch screen of the terminal device.

Furthermore, when the user has not used the touch screen for a period of time, the indicator showing the work mode can be hidden or the displaying of the indicator can be closed by a pre-set close button. This way, the indicator is kept from interrupting the view of the user.

The Fourth Embodiment

Figure 5:
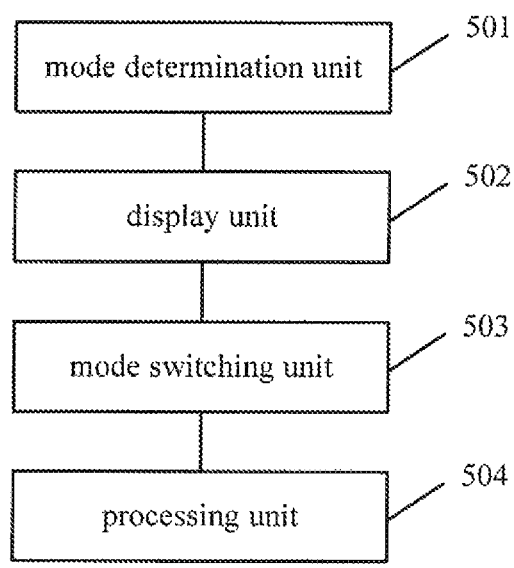
FIG. 5 is a structure block diagram of a touch screen control device according to a fourth embodiment of this invention.

Based on the same inventive concept and according to the touch screen control method provided by the embodiments of this invention, correspondingly another embodiment of this invention also provides a touch screen controlling device, applied to control the touch screen when the terminal device has been connected with the head-mounted display device, and the touch screen of the terminal device is not visible. The structure block diagram of the device is shown in FIG. 5, and the device includes the following components.

A mode determination unit 501 is used to determine that the touch screen is working in the track mode.

A display unit 502 is used to obtain the finger's sliding track when the finger is sliding on the touch screen and to display the sliding track on both the terminal device and the head-mounted display device synchronously.

A mode switching unit 503 is used to switch the touch screen from the track mode to a trigger mode when a switching condition is satisfied.

A processing unit 504 is used to trigger the touch screen to perform the corresponding function in accordance with an operation instruction to the touch screen when the operation instruction to the touch screen is detected.

Further, the mode determination unit 501 is specifically used to confirm that the work mode switching button on the terminal device is set in a track mode state, wherein the work mode switching button is set on the side key of the terminal device or is set in the touch screen area of the terminal device and is used to control the switching of the touch screen between the track mode and the trigger mode.

Alternatively, the touch screen is triggered to work in the track mode based on the pre-set track graph, or the touch screen is set in the track mode initially at default.

Furthermore, the display unit 582 is in particularly used to send displaying content of the terminal device to the head-mounted display device. The displaying content includes the sliding track. When the sliding track is displayed on the mobile device, the sliding track is also displayed on the head-mounted display device.

In one embodiment, before the touch screen is switched from the track mode to the trigger mode, it further includes that once it is determines that finger has slid to the target position according to the sliding track displayed in the head-mounted display device, stops sliding of the finger, take the finger off the touch screen and maintain the position of the finger relative to the touch screen, and inputs the work mode switching signal to the terminal device. The mode switching unit 503 is specifically used to, according to the sliding track displayed in the head-mounted display device, stop sliding of the finger after determining that the finger has slid to the target position, and take the finger of the touch screen and maintain the position of the finger relative to the touch screen. When the work mode switching signal has been received, the mode switching unit 503 switches the touch screen from the track mode to the trigger mode according to the work mode switching signal.

In another embodiment, before the touch screen is switched from the track mode to the trigger mode, it further includes that once it is determines that finger has slid to the target position according to the sliding track displayed in the head-mounted display device, stops sliding of the finger, maintain the position of the finger relative to the touch screen, and inputs the work mode switching signal to the terminal device. The mode switching unit 503 is specifically used to, according to the sliding track displayed in the head-mounted display device, stop the sliding of the finger after determining that the finger has slid to the target position, and take the finger off the touch screen and maintain the position of the finger relative to the touch screen. When it is detected that the finger stops sliding and leaves the touch screen, the mode switching unit 503 switches the touch screen from the track mode to the trigger mode.

In addition, this operation instruction is input by the user according to the target position and the relative position of the finger and the touch screen.

Further, when the work mode switching button of the terminal device is the floating button set within the touch screen area of the terminal device, the display unit 502 is specifically utilized to hide the floating button displayed on the touch screen or close the displaying of the floating button by the pre-set close button when the user has not used the touch screen for the preset time.

Each of the above-described functional units can correspond to the respective steps of the methods shown in FIGS. 1-4. This corresponding relationship will not be discussed here redundantly.

In summary, the embodiments provided in this invention comprising: determining that the touch screen is working in a track mode; when a finger is sliding on the touch screen, the embodiments obtain the sliding track of the finger, and display the sliding track on both the terminal device and the head-mounted display device synchronously for locating the finger's position on the touch screen; receive a work mode switching signal input by a user, and switch the touch screen to a trigger mode according to the work mode switching signal. When operation instructions to the touch screen are detected, the touch screen is triggered to perform the corresponding functions according to the operation instructions. Compared with the existing technologies the method and device provided by the embodiments of this invention have a higher control precision of the touch screen, do not need to add any additional hardware and thus reduce the cost invested.

The touch screen control device of the embodiments in this application can be implemented through computer program. Those who skilled in the related art should appreciate that the above-described module division is merely one kind of numerous module divisions. As long as the touch-screen control device has the above-described functions, even if it is divided into other modules or is not divided into any modules, it should still be within the scope of protection of this application.

Obviously, those skilled in the related art can make various modifications and variations to this invention without departing from the spirit and scope of the invention. Thus, if these modifications and variations of this invention are contained within the scope of the claims of the invention and its equivalents, this invention is also intended to encompass such modifications and variations.

The invention claimed is:

1. A method for controlling a head-mounted display device by a terminal device, applied to control a touch screen of the terminal device after the terminal device has been connected to the head-mounted display device and the touch screen of the terminal device is not visible, the method comprises:
   determining that the touch screen is working in a track mode;
   when a finger is sliding on the touch screen, obtaining a sliding track of the finger and displaying the sliding track on both the terminal device and the head-mounted display device synchronously, wherein the sliding track is used to locate the position of the finger on the touch screen;
   when a switching condition is satisfied, switching the touch screen from the track mode to a trigger mode; and
   when an operation instruction to the touch screen is detected, triggering the touch screen to perform a corresponding function in accordance with the operation instruction.

2. The method of claim 1, wherein determining that the touch screen is working in a track mode comprises:
   confirming that a work mode switching button on the terminal device is set in a track mode state, wherein the work mode switching button is set on the side key of the terminal device or in the touch screen area of the terminal device and is used to control switching of the touch screen between the track mode and the trigger mode;

alternatively, triggering the touch screen to work in the track mode by a preset track graph; and alternatively, setting the touch screen to work initially in the track mode at default.

3. The method of claim 2, wherein when a switching condition is satisfied, switching the touch screen from the track mode to a trigger mode comprises:

once it is determined that the finger has slid to a target position according to the sliding track displayed on the head-mounted display device, stopping sliding of the finger, taking the finger off the touch screen and maintaining the position of the finger relative to the touch screen; and when a signal for switching the work mode is received by the terminal device, switching the touch screen from the track mode to the trigger mode according to the signal for switching the work mode.

4. The method of claim 2, wherein when the switching condition is satisfied, switching the touch screen from the track mode to a trigger mode comprises:

once it is determined that the finger has slid to a target position according to the sliding track displayed on the head-mounted display device, stopping sliding of the finger, taking the finger off the touch screen and maintaining the position of the finger relative to the touch screen; and when it is detected that the finger stops sliding and leaves the touch screen, switching the touch screen of the terminal device from the track mode to the trigger mode.

5. The method of claim 2, wherein in the case that the work mode switching button of the terminal device is a floating button set on the touch screen area of the terminal device, when the touch screen has not been used for a preset time period, hiding the floating button displayed on the touch screen or closing the displaying of the floating button by a preset close button.

6. A device for controlling a head-mounted display device by a terminal device, applied to control a touch screen of the terminal device after the terminal device has been connected to the head-mounted display device and the touch screen of the terminal device is not visible, the device comprises:

a processor and one or more machine-readable storage medium operatively connected to the processor, the machine-readable storage medium storing machine-executable instructions that can be executed by the processor, and when executed by the processor, the machine-executable instructions perform operations including:

determining that a touch screen is working in a track mode;

when a finger is sliding on the touch screen, obtaining a sliding track of the finger and displaying the sliding track on both the terminal device and the head-mounted display device synchronously, wherein the sliding track is used to locate the position of the finger on the touch screen;

switching the touch screen from the track mode to a trigger mode when a switching condition is satisfied; and when an operation instruction to the touch screen is detected, triggering the touch screen to perform a corresponding function in accordance with the operation instruction.

7. The device of claim 6, wherein the step of determining that the touch screen is working in a track mode including the additional steps of:

confirming that a work mode switching button on the terminal device is set in a track mode state, wherein the work mode switching button is set on the side key of the terminal device or in the touch screen area of the terminal device and is used to control switching of the touch screen between the track mode and the trigger mode;

alternatively, triggering the touch screen to work in the track mode by a preset track graph; and alternatively, setting the touch screen to work initially in the track, mode at default.

8. The device of claim 7, wherein when a switching condition is satisfied, the step of switching the touch screen from the track mode to a trigger mode includes:

once it is determined that the finger has slid to a target position according to the sliding track displayed on the head-mounted display device, stopping sliding of the finger, taking the finger off the touch screen and maintain the position of the finger relative to the touch screen; and when a signal for switching the work mode is received by the terminal device, switching the touch screen from the track mode to the trigger mode according to the signal for switching the work mode.

9. The device of claim 7, wherein when the switching condition is satisfied, the step of switching the touch screen from the track mode to a trigger mode including:

once it is determined that the finger has slid to a target position according to the sliding track displayed on the head-mounted display device, stopping sliding of the finger, taking the finger off the touch screen and, maintain the position of the finger relative to the touch screen; and when it is detected that the finger stops sliding and leaves the touch screen, switching the touch screen of the terminal device from the track mode to the trigger mode.

10. The device of claim 7, wherein when executed by the processor the machine-executable instructions perform operations further including: in the case that the work mode switching button of the terminal device is a floating button set on the touch screen area of the terminal device, when the touch screen has not been used for a preset time period, hiding the floating button displayed on the touch screen or closing the displaying of the floating button by a preset close button.

* * * * *